United States Patent [19]

Breault et al.

[11] Patent Number: 5,732,463
[45] Date of Patent: Mar. 31, 1998

[54] METHOD OF PREPARING A FUEL CELL ELECTRODE

[75] Inventors: Richard D. Breault, Coventry; John Donahue, Suffield; Robert L. Haven, Enfield, all of Conn.

[73] Assignee: International Fuel Cells Corporation, South Windsor, Conn.

[21] Appl. No.: 546,332

[22] Filed: Oct. 20, 1995

[51] Int. Cl.$^6$ ............................................. H01R 43/00
[52] U.S. Cl. ........................ 29/825; 29/419.1; 204/280; 204/290 R; 427/113; 427/115; 429/43; 429/45
[58] Field of Search ........................... 29/419.1, 825; 427/113, 115, 122; 204/280, 290 R; 429/43, 45

[56] References Cited

U.S. PATENT DOCUMENTS

| | | |
|---|---|---|
| 3,567,520 | 3/1971 | Dennery et al. . |
| 4,177,159 | 12/1979 | Singer ............................ 252/428 |
| 4,233,181 | 11/1980 | Goller et al. . |
| 4,287,232 | 9/1981 | Goller et al. ..................... 427/113 |
| 4,329,159 | 5/1982 | Bull . |
| 4,381,254 | 4/1983 | Wrobleski . |
| 4,465,533 | 8/1984 | Corvitch ........................ 156/204 |
| 4,816,431 | 3/1989 | Furuya et al. . |
| 5,124,018 | 6/1992 | Furuya et al. ................ 204/290 R X |

FOREIGN PATENT DOCUMENTS

| | | |
|---|---|---|
| 0027648 | 4/1981 | European Pat. Off. . |
| 2315318 | 1/1977 | France . |
| 4209292 | 9/1993 | Germany . |

*Primary Examiner*—Carl I. Arbes

[57] ABSTRACT

The present invention discloses a method for preparing a catalyst to be applied to an electrode substrate, the method incorporates cooling the catalyst material to a temperature below a critical temperature and grinding the cooled catalyst to produce a catalyst material which will create a uniform catalytic layer on an electrode substrate. The finished electrode having significantly fewer particles than the electrode prepared by the prior art method.

1 Claim, 1 Drawing Sheet

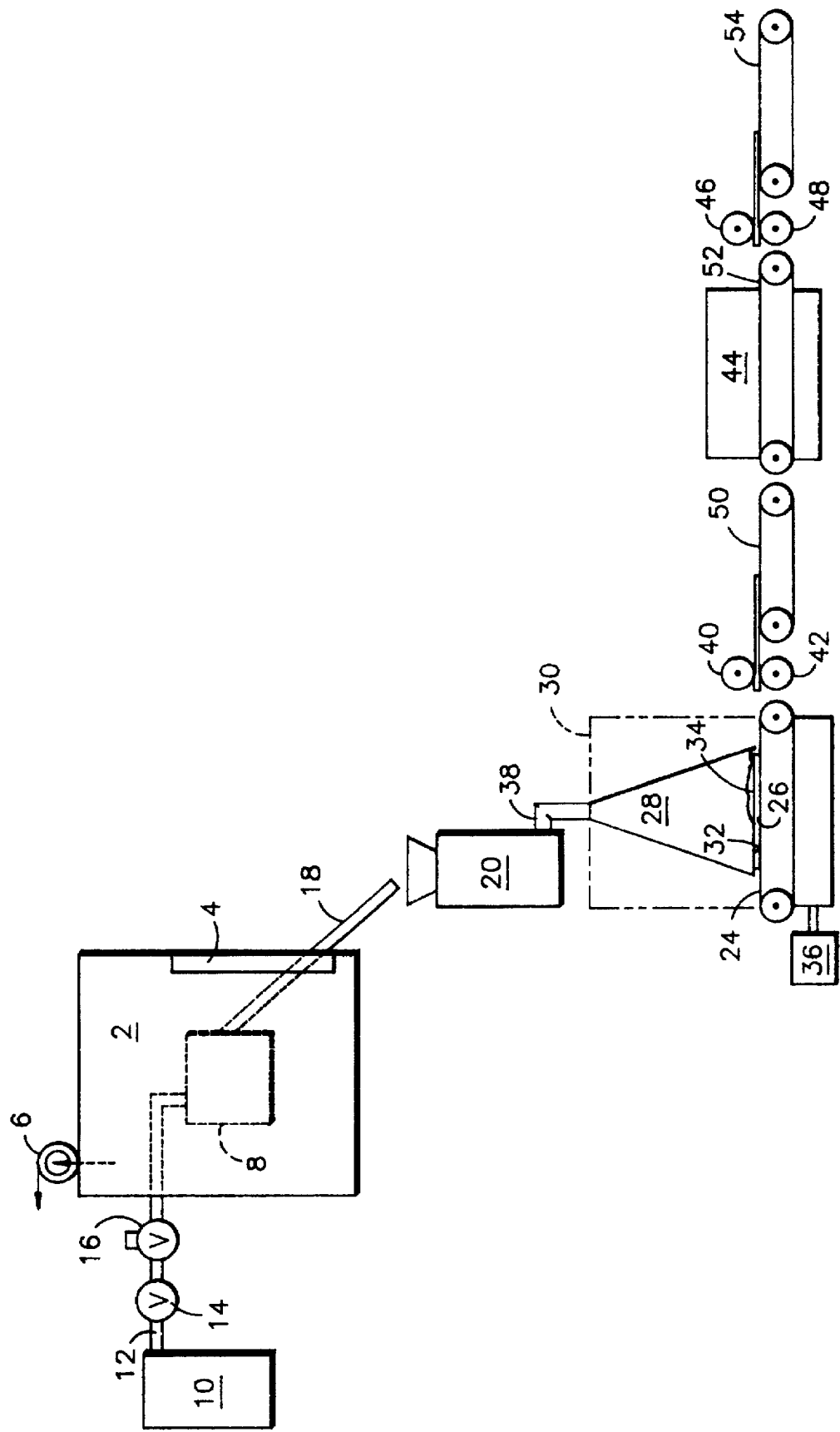

METHOD OF PREPARING A FUEL CELL ELECTRODE

TECHNICAL FIELD

This invention relates to electrochemical cell electrodes and, more particularly a method of preparing said electrodes.

BACKGROUND ART

Electrodes for use in electrochemical cells such as fuel cells are well known in the art. One common type of electrode is the gas diffusion electrode. A pair of gas diffusion electrodes are dispose on either side of an electrolyte. A catalyst is disposed on the electrolyte facing surface of each of the electrodes. Hydrogen is fed to the back side of the anode electrode while oxygen is fed to the backside of the cathode. The gases diffuse through the electrodes and react with the electrolyte in the presence of the catalyst. The catalysts used to prepare these electrodes comprise a mixture of polytetrafluoroethylene particles combined with a catalyst supported on carbon particles.

There have been a number of methods of preparing the electrodes for use in these electrochemical cells. Typically, these methods include applying a catalyst in the form of small particles onto the surface of a carbon paper substrate. Then applying a vacuum and heat to bond and sinter the catalyst thereby forming the electrode.

One such method is described in detail in U.S. Pat. No. 4,287,232 to Goller et al. entitled Dry Floc Method for Making an Electrochemical Cell Electrode which issued on Sep. 1, 1981; and U.S. Pat. No. 2,233,181 to Goller et al. entitled Automated Catalyst Processing for Cloud Electrode Fabrication for Fuel Cells, which issued on Nov. 11, 1980, both of which are incorporated by reference herein. These references teach a method of preparing the catalyst material and then introducing a preweighed amount of catalyst into a grinder where the catalyst is reduced in particle size and then in a continuous process is directed into a cloud chamber which is positioned over the surface of the electrode substrate to which the catalyst is to be applied. By applying a vacuum to the under side of the substrate the catalyst is drawn to the surface of the substrate and a uniform catalytic layer is formed. The coated substrate is then compacted and passed through an oven where the catalyst is sintered and dried.

As successful as these approached have been, it has been determined that during the sintering/drying process there are periodically found bumps or pimples in the catalytic surface. These pimples are indistinguishable from extraneous material during the quality check of these parts and, since they cannot be identified as to what the make-up of the pimples are the part must be scrapped.

Therefore what is needed in this art area is a method of making electrodes which eliminates these pimples and ideally improves the performance of the electrodes as well.

BRIEF DESCRIPTION OF THE INVENTION

The present invention is directed primarily at a manufacturing process for catalytic material useful in the preparation of a catalytic layer formed on the surface of an electrode substrate which is substantially free of pimples. The method consists of placing a weighed amount of catalytic material in a container, adding sufficient coolant to lower the temperature of the catalyst to below its critical temperature and then placing the cooled catalyst into a grinder and reducing the catalyst particles to the desired size.

Also described is a method for preparing electrodes for use in electrochemical cells in which the ground catalyst prepared as described above is then directed to a cloud chamber where it is applied to the surface of the substrate and then the substrate is passed into an oven where the catalytic layer is sintered.

The foregoing and other features and advantages of the present invention will become more apparent in the light of the following details description of the preferred embodiment as illustrated by the accompanying drawing.

BRIEF DESCRIPTION OF THE DRAWING

FIG. 1 is a schematic representation of a system useful in grinding the catalyst.

BEST MODE FOR CARRYING OUT THE INVENTION

Referring to the FIGURE, a housing 2 which is essentially a box contains a door 4 which permits entry into the housing and a blower 6 which can be used to exhaust the atmosphere of the housing. Also positioned inside the housing 2 is a bucket 8 for holding the catalyst to be cooled. The preferred catalyst used for this process comprises a mixture of polytetrafluoroethylene particles and carbon supported catalyst particles which are mixed together in an aqueous slurry and which are caused to floc out of the slurry as described in the Goller patents referenced herein. The catalyst is then dried and is stored until it is ready to be applied to the substrate. Typically the flocced catalyst comprises about between about 29% wt and about 50% wt polytetrafluoroethylene and about 71% wt to about 50% wt carbon supported catalyst. Further disclosed is a source of cooling medium 10 and pipes or other conduits 12 used to carry the cooling medium from the source 10 to the container 8. Typically the cooling medium will be a liquid which is capable of cooling the catalyst to the desired temperature quickly, will evaporate or can be removed quickly while not significantly raising the temperature of the catalyst and does not pose a safety hazard. The preferred material is liquid nitrogen, however, other material may be used such as liquid helium. It is desired to cool the catalyst below a critical temperature which results in electrodes having significantly fewer pimples. It is believed this temperature is below 32° F. This temperature is below the freezing point of any water which may be present in the catalyst particles. In addition, this temperature is likely to be below the phase transition temperature of the binder material mixed with the catalyst to form the particles such as in this instance, polytetrafluoroethylene. However, it is preferred that the temperature of the coolant be below $-50°$ F. for a number of reasons. First, the cooler the particles are during grinding, the easier they will be to break into smaller pieces. Secondly, the cooler the coolant is, the faster the particules will reach at least the crtitical temperature and are likely to get even colder, thereby speeding up the process. For catalysts of the present disclosed composition, 30–45 grams of catalyst material are cooled for about 45 seconds from the initial introduction of the liquid nitrogen before being transferred to the grinder. As it is likely that other materials may be used to make the catalyst particles this critical temperature may vary. However, in using liquid nitrogen it is virtually assured that whatever critical temperature a material may have it will be above that of the temperature of liquid nitrogen ($-320°$ F.).

To control the flow of coolant through the conduits a needle valve 14 and a cryogenic solenoid valve 16 are positioned in the conduits. A vibrating chute 18 is used to direct the cooled catalyst to the grinder 20 where the catalyst is reduced in size while it is still cold. The housing, and vibrating chute to move the cooled catalyst from the container to the grinder are all disclosed in the referenced Goller patents. Naturally it is desirable to move the cooled catalyst into the grinders as quickly as possible so as to minimize any rise in temperature which may occur or to permit the temperature of the catalyst to rise above the critical temperature. The time will vary but preferably it is less than about 60 seconds. It is also contemplated that the catalyst could be cooled outside of the housing and introduced directly from some other cooling site to the grinder.

It is preferred that the grinding process use at least two grinders as disclosed in the Goller patents. The first grinder reduces the catalyst pellets to a fairly coarse powder by using a Bantam Model W Mikro-Pulvizer with a 0.046 herringbone pattern screen, manufactured by Pulverizing Machinery Division of Mikropul, Summit, N.J. in this process the pulverized powder is directly fed into a second grinding stage which utilizes a Jet-O-Mizer manufactured by Fluid Energy Processing and Equipment Company, Hatfield, Pa. This step of reducing the catalyst particles using this system is discussed in U.S. Pat. No. 4,177,159 to Singer which issued on Dec. 4, 1979 and which is incorporated herein by reference. It is preferred that the catalyst particle size be reduced to a mean size of no smaller than about five microns and to about fifty microns. The catalyst is now ready to be applied to the electrode substrate.

A conveyer belt 24 moves an electrode substrate 26 into position under a pyramid like chamber 28 of a cloud chamber 30. Suitable mechanical means not shown, serves to move the substrate 26 relative to the chamber 28 such that the bottom edge 32 of the chamber 38 fits tightly against the outside edge 34 of substrate 26. A turbine 36 provides a controlled vacuum pressure under the substrate 26. When the turbine 36 is turned on the pre-weighed and pulverized catalyst from the grinders 22 is drawn into the chamber 28 via conduit 38 and is quickly drawn to the exposed surface of the substrate 26. The substrate is held in position with the vacuum on for a long enough time to ensure that essentially all the measured amount of the catalyst admitted to the chamber 28 has been deposited or passed through the substrate.

After application of the appropriate amount of powder to the substrate 26, the substrate 26 is automatically moved through subsequent stages of electrode fabrication process, which, in this embodiment, comprises a compacting step at rollers 40 and 42, followed by a high temperature sintering step in oven 44 which is followed by a second compaction step through rollers 44 and 46. During this process conveyor belts 50, 52, and 54 propel the electrode through the various steps respectively.

An alternative approach could be to introduce the catalyst particles to be ground into the grinder and then introduce the cooling medium to cool the catalyst particles and then immediately be able to grind the particles to the desired particle sizes.

Although it is not clear what exactly causes the pimpling problem in the first instance and therefore it is difficult to determine the mechanism of why the introduction of the cooling step substantially eliminates this problem, it is believed that by cooling the flocced catalyst to a temperature below 32° F. freezes any water remaining in the catalyst after the floc process and permits better grinding of the material. Further, it is likely that by cooling the polytetrafuoroethylene particles which are mixed in with the carbon based catalyst to this temperature, and particularly the temperature of liquid nitrogen, these particles become more brittle and themselves are more easily ground to smaller particles.

However, whatever the mechanism, the results of preparing the catalyst in this manner results in a catalyst surface formed on the substrate which contains significantly fewer incidents of pimpling and consequently fewer scrapped electrodes.

Additionally, as an additional benefit to this process is that the electrodes produced for use as cathodes electrodes form catalyst prepared in the present method exhibit improved performance stability over those electrodes made without the cooled grinding step.

Although the invention has been shown and described with respect to a preferred embodiment thereof, it should be understood by those skilled in the art that other various changes and omissions in the form and detail thereof may be made therein without departing from the spirit and the scope of the invention.

What we claim is:

1. A method for making an electrode for use as an anode or cathode in an electrochemical cell comprising;

a. cooling a weighed amount of catalyst below its critical temperature;

b. while cooled, grind the catalyst to reduce its particle size;

c. apply the ground catalyst to a surface of a porous electrode substrate;

d. compact the catalyst on the electrode surface and then sinter the catalyst.

\* \* \* \* \*